US008862693B2

(12) United States Patent
Hershko et al.

(10) Patent No.: US 8,862,693 B2
(45) Date of Patent: Oct. 14, 2014

(54) REMOTE ACCESS AND ADMINISTRATION OF DEVICE CONTENT AND CONFIGURATION USING HTTP PROTOCOL

(75) Inventors: Yuval Corey Hershko, Haifa (IL); Nir Strauss, Yokneam Moshava (IL)

(73) Assignee: Qualcomm Incorporated, San Diego, CA (US)

(*) Notice: Subject to any disclaimer, the term of this patent is extended or adjusted under 35 U.S.C. 154(b) by 100 days.

(21) Appl. No.: 13/415,636

(22) Filed: Mar. 8, 2012

(65) Prior Publication Data

US 2013/0067026 A1  Mar. 14, 2013

Related U.S. Application Data

(60) Provisional application No. 61/452,031, filed on Mar. 11, 2011, provisional application No. 61/588,007, filed on Jan. 18, 2012.

(51) Int. Cl.
*G06F 15/16* (2006.01)
*H04L 29/12* (2006.01)
*H04L 29/08* (2006.01)

(52) U.S. Cl.
CPC .......... *H04L 61/106* (2013.01); *H04L 61/2076* (2013.01); *H04L 61/2589* (2013.01); *H04L 61/605* (2013.01); *H04L 67/02* (2013.01)
USPC .......................................... 709/217; 709/227

(58) Field of Classification Search
CPC . H04L 61/106; H04L 61/2076; H04L 61/605; H04L 61/2589
USPC .................. 709/200–203, 217–227, 228, 229
See application file for complete search history.

(56) References Cited

U.S. PATENT DOCUMENTS

| 6,185,616 B1 | 2/2001 | Namma et al. |
| 6,456,854 B1 | 9/2002 | Chern et al. |
| 6,493,551 B1 * | 12/2002 | Wang et al. ................. 455/432.1 |

(Continued)

FOREIGN PATENT DOCUMENTS

| CA | 2632510 A1 | 1/2009 |
| GB | 2418321 A | 3/2006 |
| WO | WO02073921 A2 | 9/2002 |

OTHER PUBLICATIONS

Blandford, Rafe, Previewing Nokia's Mobile Web Server, Jun. 18, 2007, 11 pages, http://www.allaboutsymbian.com/features/item/Previewing_Nokias_Mobile_Web_Server.php.

(Continued)

*Primary Examiner* — Moustafa M Meky
(74) *Attorney, Agent, or Firm* — Kilpatrick Townsend & Stockton LLP

(57) ABSTRACT

A mobile device supports a mobile server hosting an HTML web site. The mobile device has an identifier and receives dynamically updated IP addresses from a network connected through a firewall to the Internet. The mobile device reports received updates of the IP address to an HTTP server in the network that interfaces with the Internet. The HTTP server updates a redirect address record associating the identifier of the mobile device with the reported IP address. The HTTP server receives, from a web browser in the Internet, an HTTP request having the identifier of the mobile device. The HTTP server, using the redirect address record, redirects the web browser to the mobile device. The web browser sends an HTTP request directly to the mobile device.

22 Claims, 4 Drawing Sheets

(56) References Cited

U.S. PATENT DOCUMENTS

| | | | |
|---|---|---|---|
| 6,526,033 B1* | 2/2003 | Wang et al. | 370/338 |
| 6,587,882 B1 | 7/2003 | Inoue et al. | |
| 6,594,254 B1 | 7/2003 | Kelly | |
| 6,603,761 B1* | 8/2003 | Wang et al. | 370/352 |
| 7,016,328 B2 | 3/2006 | Chari et al. | |
| 7,155,521 B2 | 12/2006 | Lahti et al. | |
| 7,269,165 B2* | 9/2007 | Karino | 370/352 |
| 7,366,840 B2 | 4/2008 | Tapola | |
| 7,523,491 B2 | 4/2009 | Dosa Racz et al. | |
| 7,620,001 B2 | 11/2009 | Ganji | |
| 7,729,366 B2* | 6/2010 | Mok et al. | 370/401 |
| 8,085,891 B2* | 12/2011 | Owen | 375/354 |
| 8,311,042 B2* | 11/2012 | Nath et al. | 370/395.3 |
| 8,438,285 B2 | 5/2013 | Brown et al. | |
| 8,443,420 B2 | 5/2013 | Brown et al. | |
| 2003/0018710 A1 | 1/2003 | Choi | |
| 2003/0037254 A1 | 2/2003 | Fischer et al. | |
| 2003/0056207 A1 | 3/2003 | Fischer et al. | |
| 2004/0139227 A1 | 7/2004 | Takeda | |
| 2004/0179537 A1* | 9/2004 | Boyd et al. | 370/395.54 |
| 2004/0203752 A1* | 10/2004 | Wojaczynski et al. | 455/432.1 |
| 2005/0010656 A1 | 1/2005 | Lee | |
| 2005/0015584 A1 | 1/2005 | Takechi et al. | |
| 2005/0018624 A1 | 1/2005 | Meier et al. | |
| 2005/0043938 A1 | 2/2005 | Viken et al. | |
| 2005/0114895 A1 | 5/2005 | Ismail et al. | |
| 2005/0165909 A1 | 7/2005 | Cromer et al. | |
| 2005/0246414 A1 | 11/2005 | Barda | |
| 2006/0080404 A1 | 4/2006 | Haber-Land-Schlosser et al. | |
| 2006/0154662 A1* | 7/2006 | Kil et al. | 455/435.1 |
| 2006/0195506 A1 | 8/2006 | Deng | |
| 2006/0200503 A1 | 9/2006 | Dosa et al. | |
| 2006/0200541 A1 | 9/2006 | Wikman et al. | |
| 2007/0047585 A1* | 3/2007 | Gillespie et al. | 370/475 |
| 2007/0160001 A1 | 7/2007 | Lovegren et al. | |
| 2007/0165579 A1 | 7/2007 | Delibie et al. | |
| 2007/0180081 A1 | 8/2007 | Okmianski et al. | |
| 2007/0197260 A1 | 8/2007 | Randall et al. | |
| 2007/0214209 A1 | 9/2007 | Maeda | |
| 2008/0005290 A1 | 1/2008 | Nykanen et al. | |
| 2008/0123624 A1 | 5/2008 | Strandell et al. | |
| 2008/0166997 A1 | 7/2008 | Sun et al. | |
| 2008/0248834 A1 | 10/2008 | Chatterjee et al. | |
| 2008/0313255 A1 | 12/2008 | Geltner et al. | |
| 2009/0036111 A1 | 2/2009 | Danford et al. | |
| 2009/0106366 A1 | 4/2009 | Virtanen et al. | |
| 2009/0150904 A1 | 6/2009 | Champagne et al. | |
| 2009/0222438 A1 | 9/2009 | Strandell et al. | |
| 2009/0228545 A1 | 9/2009 | Mendez et al. | |
| 2010/0015916 A1 | 1/2010 | Holcman et al. | |
| 2010/0131583 A1 | 5/2010 | Lee et al. | |
| 2010/0178953 A1 | 7/2010 | Blewett et al. | |
| 2010/0211563 A1 | 8/2010 | Macchietti et al. | |
| 2010/0211637 A1 | 8/2010 | Borzsei et al. | |
| 2010/0215035 A1 | 8/2010 | Jeng Yen | |
| 2010/0330976 A1 | 12/2010 | Berna Fornies et al. | |
| 2011/0145391 A1 | 6/2011 | Ivershen | |
| 2012/0210205 A1* | 8/2012 | Sherwood et al. | 715/234 |
| 2013/0047020 A1 | 2/2013 | Hershko et al. | |
| 2013/0067084 A1 | 3/2013 | Hershko et al. | |
| 2013/0067085 A1 | 3/2013 | Hershko et al. | |
| 2013/0067086 A1 | 3/2013 | Hershko et al. | |
| 2013/0074108 A1* | 3/2013 | Cline et al. | 725/5 |

OTHER PUBLICATIONS

Nokia, Overview from Mobile Web Server, 2010, 2 pages, http://research.nokia.com/page/231.

Kawamura, S. et al., End-to-End Mobility Management: A Two-Phase Deployment Scheme for Personal Use. International Conference on Wireless Networks, 2004, p. 1-6, See p. 4 col. 2, (ICWN-4).

International Search Report and Written Opinion—PCT/US2012/028518—ISA/EPO—Jun. 14, 2012.

* cited by examiner

REMOTE ACCESS AND ADMINISTRATION OF DEVICE CONTENT AND CONFIGURATION USING HTTP PROTOCOL

CLAIM OF PRIORITY UNDER 35 U.S.C. §119

The present application for patent claims priority to the following:
Provisional Application No. 61/452,031 entitled "Remote Access and Administration of Device Content and Configuration Using HTTP Protocol," filed Mar. 11, 2011, and assigned to the assignee hereof and hereby expressly incorporated by reference herein; and
Provisional Application No. 61/588,007 entitled "Remote Access and Administration of Device Content and Configuration Using HTTP Protocol," filed Jan. 18, 2012, and assigned to the assignee hereof and hereby expressly incorporated by reference herein.

REFERENCE TO CO-PENDING APPLICATIONS FOR PATENT

The present Application for Patent is related to the following co-pending U.S. patent Applications:
"SYSTEM AND METHOD USING A WEB PROXY-SERVER TO ACCESS A DEVICE HAVING AN ASSIGNED NETWORK ADDRESS," by Yuval Corey Hershko and Nir Strauss, filed Mar. 8, 2012 as U.S. Ser. No. 13/415,614, assigned to the assignee hereof, and expressly incorporated by reference herein; and
"SYSTEM AND METHOD USING A CLIENT-LOCAL PROXY-SERVER TO ACCESS A DEVICE HAVING AN ASSIGNED NETWORK ADDRESS," by Yuval Corey Hershko and Nir Strauss, filed Mar. 8, 2012 as U.S. Ser. No. 13/415,604, assigned to the assignee hereof, and expressly incorporated by reference herein.
"SYSTEM AND METHOD USING FOR ACCESSING A DEVICE HAVING AN ASSIGNED NETWORK ADDRESS," by Yuval Corey Hershko and Nir Strauss, filed Mar. 8, 2012 as U.S. Ser. No. 13/415,581, assigned to the assignee hereof, and expressly incorporated by reference herein.

FIELD OF DISCLOSURE

The field of disclosure relates to mobile device operation in general, and more particularly, to the remote operation and management of a mobile device using a Hyper Text Transfer Protocol (HTTP) protocol.

BACKGROUND

Remote access by users to content on their own mobile device, and to the configuration of their mobile device, can be limited and, to the extent it is available, typically requires running of proprietary protocols and, therefore, installation of proprietary applications on the device (e.g., personal computer or other mobile device) from which the user attempts such remote access to his or her mobile device. For example, if a user inadvertently leaves his or her mobile device at home or at work, the user's options for remote access to any content or configuration not uploaded to or synched with a cloud device, or with another device in the user's possession, are limited. The user can, as one partial solution, make a habit of leaving his or her mobile device connected, for example via a USB cable, as a disk drive to a personal computer that is connected to the Internet, and to which the user has remote access, for example by Microsoft Remote Desktop Connection, or an equivalent, and leaving that personal computer powered up. This option, though, requires meeting concurrent conditions, e.g., the mobile device being connected via the USB or equivalent, and the personal computer to which it is connected being powered up.

Conventional methods also provide very limited options for remote access by third parties to content of a user's mobile device. Proprietary applications can be installed on the mobile device and on the devices, e.g., personal computers, through which the third parties can attempt to access the mobile device. This option can have shortcomings. One is the need for proprietary applications to be installed on the third party devices.

SUMMARY

Exemplary embodiments provide systems and methods for remotely accessing, managing and controlling a mobile device, using conventional HTTP protocol, readily performed by off-the-shelf web browsers hosted on conventional Internet access devices, for example smart phones, and personal computers, conventionally connected to connected to the Internet by, for example, an Internet Service Provider (ISP).

Various methods according to one exemplary embodiment provide accessing a web site on a mobile device, through aspects including receiving at the mobile device an update of a mobile device IP address dynamically assigned to the mobile device, sending from the mobile device to an HTTP server an updated dynamically assigned address report, having the updated mobile device IP address and a mobile device identifier, sending from the HTTP server, in response to the HTTP request, a redirect HTTP response having the updated mobile device IP address, receiving at the HTTP client, from the HTTP server, a redirect HTTP response having the updated mobile device IP address; and sending an HTTP request from the HTTP client to the mobile device at the updated mobile device IP address in the redirect HTTP.

In an aspect, various methods according to the one exemplary embodiment can include the HTTP request based on the redirect HTTP response having a request to access a web site hosted on the mobile device.

In an aspect, various methods according to the one exemplary embodiment can further include sending from the HTTP client to the mobile device identified by the updated mobile device IP address included in the redirect HTTP response, a request for activating a service on the mobile device.

In one aspect, various methods according to one exemplary embodiment, sending from the mobile device to the HTTP server the updated dynamically assigned address report, can include activating an HTTP client on the mobile device, sending from the HTTP client on the mobile device an HTTP client request to the HTTP server, the HTTP client request having the updated dynamically assigned address report, receiving at the mobile device an HTTP server response to the HTTP client request, and de-activating the HTTP client on the mobile device in response to receiving the HTTP server response.

Various mobile devices according to one exemplary embodiment can include a storage for storing a mobile device identifier (MDID), a communication interface for receiving from a network an update of a dynamically assigned network address (MD_IP), and a processor coupled to the communication interface, configured to control the communication interface to transmit, in response to receiving the updated MD_IP, a mobile device updated address report to an HTTP server, the mobile device updated address report having the updated MD_IP and the MDID.

In an aspect, processors of various mobile devices according to one exemplary embodiment can include an HTTP web server configured to support a server-side scripting engine. In a further aspect the HTTP web server can be configured to host an HTML web site configured to provide, in response to given HTTP requests, access to a content stored on the mobile device.

Various methods according to another exemplary embodiment can provide access to a web site on a mobile device, and can include sending from a client, through the Internet, to an HTTP server connected to the network, a request to access the web site, the request being without an address of the mobile device within the network, and receiving at the client a response from the HTTP server the response having the address of the mobile device.

Various methods according to another exemplary embodiment can provide access to a mobile device, and can include receiving from the mobile device a report, the report having an updated dynamically assigned address and an identifier for the mobile device, and can further include storing in a redirect address database, in a manner retrievable based on the identifier for the mobile device, a redirect address record associating the identifier for the mobile device with the updated dynamically assigned address, receiving a request to access the mobile device, the request having the identifier for the mobile device, retrieving the redirect address record associated with the received identifier for the mobile device, and sending to the HTTP client a redirect response to access the mobile device, based at least in part on the updated dynamically assigned address in the retrieved redirect address record.

Various apparatuses according to one exemplary embodiment can include means for receiving at the mobile device an update of a dynamically assigned address, means for sending from the mobile device to an HTTP server an updated dynamically assigned address report having the updated dynamically assigned address and a mobile device identifier, means for sending from an HTTP client to the HTTP server an HTTP request having the mobile device identifier, means for receiving at the HTTP client, from the HTTP server, a redirect HTTP response having the dynamically assigned IP address of the mobile device, and means for receiving at the mobile device an HTTP request, associated with the redirect HTTP response, to access a web site on the mobile device.

Various apparatuses according to another exemplary embodiment can provide accessing a web site on a mobile device on a network and can include means for sending from a client, through the Internet, to an HTTP server connected to the network, a request to access the web site, the request being without an address of the mobile device within the network, and means for receiving at the client a response from the HTTP server the response having the address of the mobile device.

Various apparatuses according to another exemplary embodiment can provide accessing a web site and can include means for receiving from the mobile device a report, the report having an updated dynamically assigned address and an identifier for the mobile device, means for storing in a redirect address database, in a manner retrievable based on the identifier for the mobile device, a redirect address record associating the identifier for the mobile device with the updated dynamically assigned address, and can further include means for receiving from an HTTP client a request to access the mobile device, the request having the identifier for the mobile device, means for retrieving the redirect address record associated with the received identifier for the mobile device, and means for sending to the HTTP client a redirect response to access the mobile device, based at least in part on the updated dynamically assigned address in the retrieved redirect address record.

Various computer-readable media comprising instructions according to one exemplary embodiment which, when executed by a processor apparatus in a wireless communications system, cause the processor apparatus to perform operations carrying out a method for accessing a mobile device, can comprising instructions that cause the processor apparatus to receive at the mobile device an update of a mobile device IP address dynamically assigned to the mobile device, send from the mobile device to an HTTP server an updated dynamically assigned address report, having the updated mobile device IP address and a mobile device identifier, send from an HTTP client to the HTTP server a request to access the mobile device, the request having the mobile device identifier, receive at the HTTP client, from the HTTP server, a redirect HTTP response having the updated mobile device IP address, and send an HTTP request from the HTTP client to the mobile device at the updated mobile device IP address in the redirect HTTP response.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
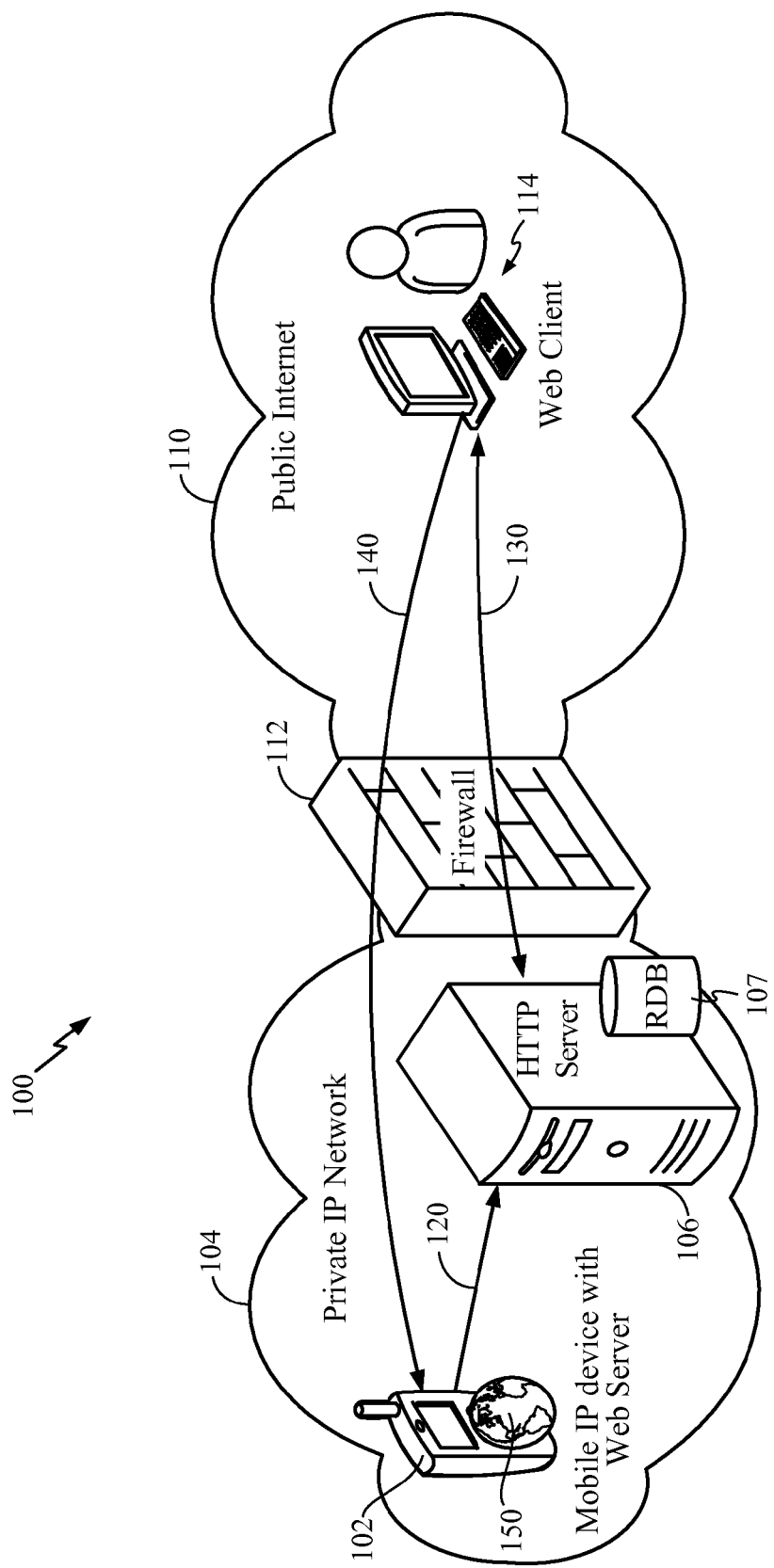
FIG. 1 is a high level schematic diagram of one mobile server, multi-network access system according to one exemplary embodiment.

Various aspects of the invention are disclosed in the following description and related drawings directed to specific embodiments. Alternate embodiments may be devised without departing from the scope of the invention. Additionally, well-known elements will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Systems and methods according to one exemplary embodiment can provide to a user within a first network remote access to content of a mobile device connected within a second network, using a conventional Hyper Text Transfer Protocol (HTTP) browser, with access to the mobile device within the second network being by a dynamically updated address not necessarily available to the user within the first network.

Methods according to one exemplary embodiment can include, and utilize, a mobile device configured to support or host a server (hereinafter referenced as the "mobile server") and, in an aspect, the mobile device can be configured to host a web site (hereinafter referenced as the "mobile web site"). In a further aspect, the mobile web site can be configured to provide to users in the first network, using for example nothing more than the conventional HTTP browser, access to content of the mobile device. In an aspect, the first network can be the Internet and the second network can be a private network interfacing to the Internet through, for example, a firewall.

As will be appreciated by persons of ordinary skill in the art from reading this disclosure, in accordance with one or more exemplary embodiments, the mobile web site hosted on the mobile device can provide an easy-to-navigate means for users, by means of a conventional web browser hosted on a conventional device connected to the Internet, to remotely identify and access content of the mobile device.

Methods according to one or more exemplary embodiments can include assigning the mobile device a device identifier (MDID). In one aspect the MDID can be static. As one illustration, the MDID can be a mobile telephone number, for example the mobile telephone number of a wireless cellular telephone feature of the mobile device.

Methods according to one or more exemplary embodiments can include the mobile device receiving a dynamically assigned network address and, for convenience in description, the dynamically assigned network address will be referenced hereinafter as "MD_IP." In an aspect, the MD_IP can be unique within the second network. In an aspect the MD_IP can be received periodically by the mobile device. In another aspect the MD_IP can be received by the mobile device in response to an event, for example a power-up of the mobile device from a power-down state.

In methods according to one or more exemplary embodiments, the mobile device can be configured to report its receipt of a new or updated MD_IP to an HTTP server or equivalent within the second network. In one aspect the HTTP server or equivalent (hereinafter collectively referenced as "HTTP server") can have an interface to the first network. In an aspect the reporting by the mobile device to the HTTP server of a new or updated MD_IP can include reporting the MDID of the mobile device and the newly assigned or updated MD_IP.

Methods and systems according to one or more exemplary embodiments can include the HTTP server maintaining an updated record, for example a redirect address database, of the MDID of the mobile device and its most recent reported MD_IP.

Method and systems according to various exemplary embodiments can include receiving at the HTTP server, for example from the conventional HTML browser hosted as a client on a device within the first network, an HTTP client request having the MDID of the mobile device. Methods and systems according to one exemplary embodiment can include the HTTP server, in response to receiving the HTTP client request from the conventional HTML browser in the first network, using the MDID in the HTTP client request to retrieve the most recent reported MD_IP for the mobile device. In an aspect, methods and systems according to one or more exemplary embodiments can include the HTTP server, upon retrieving the most recent reported MD_IP for the mobile device, sending an HTTP redirect response to the HTTP client, corresponding to the HTTP request received from the conventional browser in the first network, for access to the mobile web site.

In one aspect, methods and systems according to various exemplary embodiments can include the HTTP client responding to the HTTP redirect response by sending an HTTP request directly to the mobile server, for example through a firewall between the second network in which the mobile device is connected and the first network. Therefore, as will be appreciated by persons of ordinary skill in the art from the present disclosure, after the mobile server sends the HTTP response, the user can readily access content of the mobile device, using nothing more than a conventional web browser connected to the first network (e.g., the Internet).

In an aspect, methods and systems according to exemplary embodiments can include a configuration of the mobile web site, and/or a configuration of the mobile web server on the mobile device, that can provide authorized users remote administration of the mobile device. For example, according to this aspect, a server-side scripting engine on the mobile device can be provided, configured to include HTML password access scripts.

FIG. 1 is a simplified schematic diagram of a multi-network mobile server access system 100 on which one or more methods according to various exemplary embodiments can be practiced. The multi-network mobile server access system 100 can include a wireless mobile device 102 having, as described in greater detail in later sections, processing and storage capabilities to host a mobile web server 150, and having a logic and media (e.g., wireless transceiver) interface (not explicitly shown in FIG. 1) to a network referred to in the examples shown herein as the Private IP network 104. In an aspect, the Private IP network 104 of the multi-network mobile server access system 100 can include an HTTP server 106 having an interface (not separately numbered) with the Private IP network 104, an interface (not separately numbered) with a Public IP network 110 (e.g., the Internet), and having a re-direct database (RDB) 107 which is described in greater detail at later sections. As will be appreciated by persons of ordinary skill in the art having view of the entirety of this disclosure, the HTTP server 106 can be implemented with various commercially available web server applications, which can be hosted on any of various off-the-shelf hardware and software platforms for such web server applications, for example by adapting a server-side scripting engine to receive HTTP "Post" or equivalent from the wireless mobile devices 102, as previously described, and to perform HTTP redirect operations described in greater detail below.

Referring still to FIG. 1, the Private IP network 104 of the multi-network mobile server access system 100 can, but does not necessarily include a firewall 112. In aspects having the firewall 112, its configuration is not necessarily particular to the exemplary embodiments and can be in accordance with conventional firewall techniques, for example having conventional rule-based packet filtering.

Continuing to refer to FIG. 1, client/web browser 114 is shown within the Public IP network 110. The client/web browser 114, as will be described in greater detail at later sections, can be a conventional HTML web browser (not separately shown) such as, without limitation, Internet Explorer®, Safari®, Firefox®, Chrome®, Opera™, or any of the various other known commercially available HTML web browsers, hosted on for example, without limitation, any of an Apple iPhone®, HTC Droid Incredible®, RIM Blackberry®, or any of the large range of similarly capable smartphone devices, or hosted on any of various "tablets" (e.g., without limitation, Apple iPad®, Samsung Galaxy®), or hosted on a laptop or desktop personal computer (PC) running under, for example, one or more of the various known operating systems that can support the identified or equivalent HTML web browsers. Examples of operating systems under which the client/web browser 114 can operate include, without limitation, Windows® XP, Windows 7, Apple® OSX, and Linux, and for smartphones include, without limitation, Symbian ˆ3, Symbian Anna, Apple iOS, Windows Phone 7, Windows Phone Mango, and Blackberry OS 7.

Referring still to FIG. 1, the host of the client/web browser 114 can be connected to the Public IP network 110 through, for example, any one or more of the of conventional techniques, e.g., a cellular wireless (not shown) access, via EVDO, HSDPA or UMTS, or a Wi-Fi or Ethernet connection (not shown) to a cable or DSL modem (not shown), which can then connect to the Public IP network 110 through, for example, an Internet Service Provider (ISP) (not shown).

With continuing reference to FIG. 1, in one aspect the wireless mobile device 102 can be configured to receive a dynamically updated address, by which it can communicate with the HTTP server 106 and, in an aspect, the firewall 112. In an aspect, the dynamically updated address can be assigned to the wireless mobile device 102 by, for example, a Dynamic Host Configuration Protocol (DHCP) or equivalent server (not shown) within the Private IP network 104. In an aspect, the dynamically updated address of the wireless mobile device 102 can be an Internet Protocol (IP) address. Example processes and implementations according to one or more exemplary embodiments will be described assuming the dynamically updated address of the wireless mobile device 102 is an IP address and, therefore, this address will be referenced as the mobile device IP (MD_IP) address.

Referring still to FIG. 1, in an aspect each update of the MD_IP address of the wireless mobile device 102 can be unique within the Private IP network 104. In another aspect, the MD_IP address can be unique, and routable within the Public IP network 110. As described in greater detail at later sections, systems and methods according to various exemplary embodiments can, further to the aspect of the MD_IP being routable within the Public IP network 110, provide a user of the client/web browser 114 with a conventional HTTP session access (subject to restrictions, if any, imposed by the firewall 112) to the mobile web server 150 hosted on the wireless mobile device 102. As will also be described in greater detail at later sections, systems and methods according to various exemplary embodiments can provide configurations of the mobile web server 150 that, in turn, can provide various users with various access privileges to content stored on the wireless mobile device 102.

To avoid introducing complexity not essential to concepts of exemplary embodiments, example operations of and interfaces to the MD_IP address will be described as if assigned to the wireless mobile device 102, as opposed to being assigned to the mobile web server 150. It will be understood, though, that practices according to the exemplary embodiments may include multiple mobile web servers 150 hosted on a single mobile wireless device 102. As will be understood by persons of ordinary skill in the art from this disclosure, in such practices the DHCP or equivalent server assigning the MD_IP can be configured to assign a unique MD_IP to each of the separate mobile web servers 150. Similarly, to avoid unnecessary complexity only one wireless mobile device 102 is shown within the Private 113 network 104. It will be understood, however, that unless otherwise stated or made clear from the context to mean otherwise, all description referencing one wireless mobile device 102 can apply to one or more other wireless mobile devices (not shown) that are within or accessible to the Private IP network 104.

Referring still to FIG. 1, in one aspect the wireless mobile device 102 can be configured to send a report, fix example over link 120, to the HTTP server 106 each time the MD_IP address is updated. The report can, in one aspect, as previously described include a mobile device identifier (MDID) assigned to the wireless mobile device 102. In an aspect the report can be an HTTP "POST," or equivalent, communication from the wireless mobile device 102 to the HTTP server 106. With respect to implementations of the reporting by the wireless mobile device 102, persons of ordinary skill in the web server art having view of the present disclosure can readily implement such reporting of the MD_IP address, for example as the MD_IP_RPT engine 512 described in reference to FIG. 5, or client-side scripting engine, configured to perform an HTTP "POST," or equivalent. In an aspect, the HTTP server 106 can maintain, according to the reporting of MD_IP addresses by the wireless mobile device 102, the above-mentioned RDB (redirect address database) 107. The RDB 107 can be constructed to have, for example, a redirect address record or equivalent corresponding to the MDID of each wireless mobile device 102 hosting a mobile web server 150, with the redirect address record or equivalent having the most recently reported MD_IP address for that wireless mobile device 102 or having, for example, a pointer (not shown) to a location in a memory (not explicitly shown) associated with the RDB. Persons of ordinary skill in the web server art having view of the present disclosure can readily implement such RDB 107 updating functions, for example as server-side scripting engine configured to receive an HTTP "POST" or equivalent from the wireless mobile device 102, as described above, and update the RDB 107 accordingly.

In an aspect described in greater detail at later sections, one or more users having means to function as the client/web browser 114 can be given the MDID of the wireless mobile device 102 and, in a further aspect, an IP address of the HTTP server 106. As will be described, the scope of users can range from a select group of individuals to the entire public. One example MDID can be a ten-digit wireless telephone number of a wireless cellular telephone feature (not separately shown) of the wireless mobile device 102.

Continuing to refer to FIG. 1, in a further aspect, users having access to the Public IP network 110 through means performing as the client/web browser 114, and having the MDID of the wireless mobile device 102 and the IP address of the HTTP server 106, can access the HTTP server 106 with a request, for example over link 130, for the MD_IP address of the wireless mobile device 102 identified by the MDID. In a related aspect, the HTTP server 106 can be configured to respond to such a request from the client/web browser 114 by retrieving from the RDB 107 and the MD_IP address that was most recently reported to it by the identified wireless mobile device 102, and sending this to the client/web browser 114 for redirect to the mobile web server 150 of the wireless mobile device 102.

As previously described, in an aspect the MD_IP can be routable within the Public IP network 110. Assuming this aspect being used, upon the client/web browser 114 receiving the requested MD_IP address from the HTTP server 106, it can, for example over link 140, directly access the mobile web server 150 on the wireless mobile device 102. It will be understood that "directly access" can be, but is not necessarily through the firewall 112.

Figure 2:
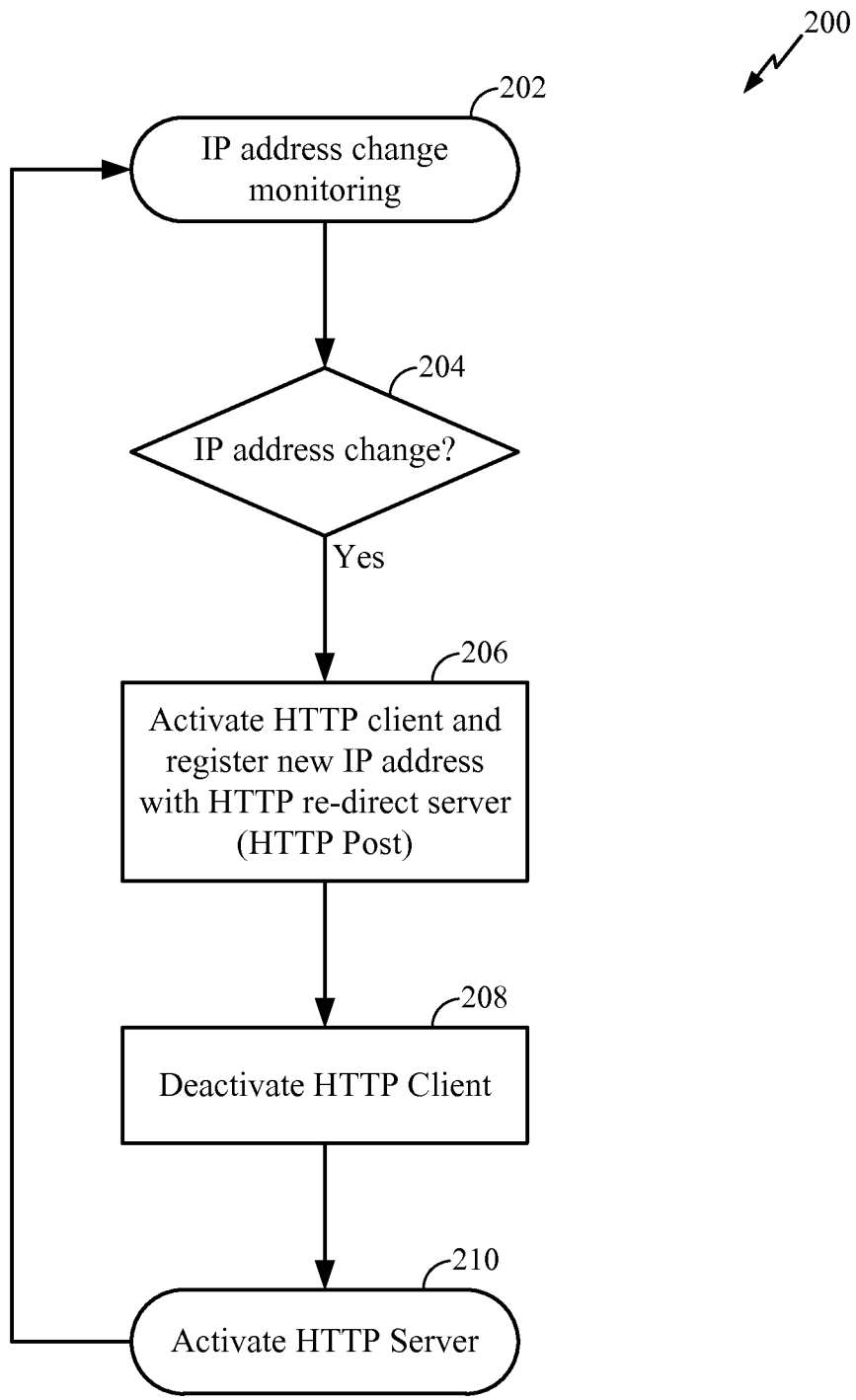
FIG. 2 shows an example process flow in one dynamic address reporting and redirect address record updating, in one dynamically addressed, multi-network public browser access, mobile server system and method in accordance with various exemplary embodiments.

FIG. 2 shows one process flow 200 in one example dynamic address reporting and redirect address record updating, in a multi-network public browser access, mobile server system and method in accordance with various exemplary embodiments. Examples according to various portions of the FIG. 2 process flow 200 will be described in reference to the FIG. 1 multi-network mobile server access system 100. It will be understood, however, that FIG. 1 is intended only to provide one example environment of the FIG. 2 process flow 200, and not intended as any limitation on the scope of systems on which processes according to the exemplary embodiments can be practiced.

Referring to FIG. 2, in one aspect a wireless mobile device in a private network, such as the FIG. 1 wireless mobile device 102 within the Private IP network 104, can be configured to perform an IP address change monitoring 202, for example monitoring for an update of the previously described MD_IP address received from a source such as, in accordance with one aspect, a DHCP server (not shown) within the Private IP network 104. Upon detecting 204 an IP address change the process flow 200 can go to 206 to perform a reporting and registering of the IP address change. In an aspect, the reporting portion of the 206 reporting and registering can include activating an HTTP client (not shown in the figures) on the wireless mobile device to send, in a client-server session, the new IP address to an HTTP redirect server. In an aspect the HTTP redirect server interfaces with the private network and with a public network, such as the Internet, supporting HTTP server-client, web browser communication.

Referring to FIGS. 1 and 2, in one example the reporting portion of the 206 reporting and registering can be implemented by configuring the wireless mobile device 102 with an HTTP client application (not shown in FIG. 1) activated upon receipt by the wireless mobile device 102 of an updated MD_IP address. In an aspect, the HTTP client application on the wireless mobile device 102 can be configured to establish, for example over link 120, a session with a corresponding HTTP server application (not explicitly shown in the figures) hosted on the HTTP server 106 and upon establishment of the session, to provide an MD_IP address update report (MD_IP_RPT). According to one aspect, the wireless mobile device 102 can be configured to include in the MD_IP_RPT the updated MD_IP address and the updated MDID that it received, for example from a DHCP server associated with the Private IP network 104.

Continuing to refer to FIGS. 1 and 2, as one example implementation of the registering portion of the 206 reporting and registering, the HTTP server 106 can be configured to respond to a MD_IP_RPT by extracting from the MD_IP_RPT the MDID of the sending wireless mobile device 102 and then searching its RDB 107 for the redirect address record corresponding to that MDID. Further, HTTP server 106 can be configured such that, when the corresponding redirect address record is found, the MD_IP address field of the redirect address record is updated.

Referring to FIG. 2, in one example of the process flow 200, after a 206 reporting and registering of an updated MD_IP address for a mobile device, there can be an HTTP client deactivation 208 at the mobile device, deactivating the previously described HTTP client activated in the 206 reporting and registering. In an aspect, upon the HTTP client deactivation 208, the process flow 200 can go to 210 and activate an HTTP web server on the mobile device and, concurrent with the active hosting, perform the above-described IP address change monitoring 202, for example as a background process. Referring to FIGS. 1 and 2, the 210 activating of an HTTP web server on the mobile device can be implemented by configuring the wireless mobile device 102 to activate its mobile web server 150 after performing the previously described reporting, over for example link 120, of its receiving an updated MD_IP address.

Figure 3:
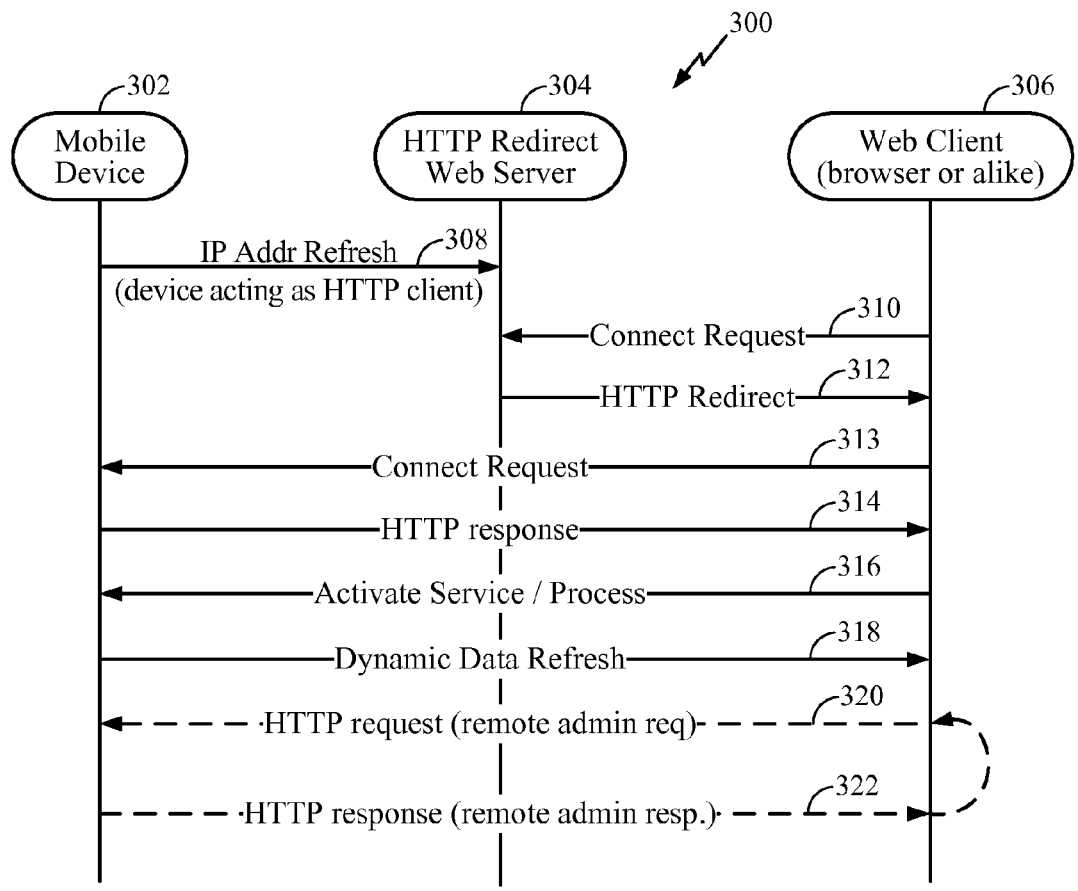
FIG. 3 is one example process flow in an aspect of a mobile server dynamic address redirecting and web browser access, in methods and systems in accordance with various exemplary embodiments.

FIG. 3 shows one process flow 300 of communications between a Mobile Device 302, an HTTP Redirect Web Server 304 and a Web Client 306, in accordance with one or more exemplary embodiments. Examples according to various portions of the process flow will be described in reference to the FIG. 1 multi-network mobile server access system 100, and in such description it will be assumed that the wireless mobile device 102 and mobile web server 150 are the example Mobile Device 302, the HTTP server 106 having the RDB 107 is the example HTTP Redirect Web Server 304 and the client/web browser 114 is the example Web Client 306.

Referring to FIG. 3, in an aspect, the process flow 300 can include the Mobile Device 302 sending an MD_IP address update report (MD_IP_RPT) 308 to the HTTP Redirect Web Server 304. In an aspect, sending of the MD_IP_RPT 308 can be according to the FIG. 2 process flow 200. Referring to FIGS. 2 and 3 together, in an aspect the IP address change monitoring 202 can be a background process during any portion of the FIG. 3 process flow 300 and, upon the detecting 204 of an IP address change, the sending an MD_IP_RPT 308 can be, for example, performed as a logical interrupt. Referring to FIGS. 1, 2 and 3, in one aspect the wireless mobile device 102 can be configured to disable sending an MD_IP_RPT 308 during one or more activity modes of the mobile web server 150. In one alternative aspect, the wireless mobile device 102 can be configured to interrupt one or more ongoing activities of the mobile web server 150 upon detecting a change in its MD_IP address.

Continuing to refer to FIG. 3, one example operation of the process flow 300 can include the HTTP Redirect Web Server 304 receiving a Connect Request 310 from the Web Client 306. Referring to FIGS. 1 and 3, in one example a Connect Request 310 can include a user having access to the Public IP network 110 through a client/web browser 114, together with the user having the MDID of the wireless mobile device 102 and the IP address of the HTTP Redirect Web Server 304. In one aspect, the MDID can be a publicly known identifier uniquely associated with an owner, or other authorized manager of content on the wireless mobile device 102. For example, the MDID can be a telephone number of a wireless cellular telephone feature (not shown in FIG. 1) of the wireless mobile device 102. In an aspect, the user can be provided with a Uniform Resource Locator (URL) associated with the IP address of the HTTP Redirect Web Server 304. In an example further to this aspect, the user can type (or enter by other graphical user interface (GUI, or by voice command) into the address field of the client/web browser 114 the given URL of the HTTP server 106, followed by a forward "/" or equivalent, followed by the MDID of the subject wireless mobile device 102, e.g., a ten-digit wireless cellular number.

Referring to FIGS. 1 and 3, to illustrate user access through the client/web browser 114 to the mobile web server 150 hosted on the wireless mobile device 102, assume as an example that the URL of the HTTP server 106 is "SERVICE.COM," and that the wireless mobile device 102 is a smartphone having a ten-digit telephone number of "XXX-YYYZZZZ." In one example, the user can enter (e.g., by typing or another of the various known techniques) into the address field of the user's client/web browser 114 the following: http://www.SERVICE.COM/XXXYYYZZZZ. The user can then, for example by pressing the "ENTER" button of a conventional keyboard, control his/her apparatus hosting the client/web browser 114 to send the FIG. 3 Connect Request" 310 in accordance with conventional HTTP protocol. Assuming the Public IP network 110 is the Internet, the Connect Request 310 can be routed, as per conventional Internet routing, to the HTTP Redirect Web Server 304, e.g., the FIG. 1 HTTP server 106.

Referring still to FIGS. 1 and 3, in one example, in response to the Connect Request 310 the HTTP Redirect Web Server 304 can search the previously described redirect address database, using the MDID included in the Connect Request 310. If a redirect address record is found, the HTTP Redirect Web Server can at 312 retrieve from its MD_IP field the most recently reported MD_IP, and send an HTTP Redirect 312, for example over a Private IP network 104 wireless link (not explicitly shown), to the Web Client 306. In an aspect, the HTTP Redirect 312 can include an IP address of the Mobile Device 302 (e.g., the IP address of the FIG. 1 wireless mobile device 102). In one further aspect, the Web Client 306 can then, in response to the HTTP Redirect 312, send an HTTP Connect Request 313 directly to the Mobile Device 302. Referring to FIG. 1, in an aspect, the HTTP Response 314 can be sent through (or, depending on the filtering rules, blocked by) the firewall 112.

Continuing to refer to FIG. 3, in an aspect, operations of the process flow 300 according to one or more exemplary embodiments can include an Activate Service/Process 316 sent from the Web Client 306 directly to the Mobile Device 302. Referring to FIGS. 1 and 3, in an aspect, "directly" can include going through (or can be blocked by) a firewall such as the firewall 112. In a related aspect, operations of the process flow 300 according to one or more exemplary embodiments can include a Dynamic Data Refresh 318 sent from the Web Client 306 directly to the Mobile Device 302.

Referring still to FIG. 3, in an aspect, operations such as shown by the process flow 300 in accordance with one or more exemplary embodiments can include a user having certain authorization being provided remote administrative access to the Mobile Device 302. In an aspect, remote administrative access can be provided by configuring the Mobile Device 302, e.g., by configuring the mobile web server 150 that is hosted on the wireless mobile device 102 to include a server side scripting engine (not shown in FIGS. 1-3) for authorized users to have remote access, for example using the client/web browser 114, to data and information on the wireless mobile device 102 such as, for example, password-protected documents, mobile web server configuration files, access history, or any combination thereof. In a related aspect, the Mobile Device 302 can be configured to send HTTP responses 322 facilitating the user at the Web Client 306 to perform remote administration.

Figure 4:
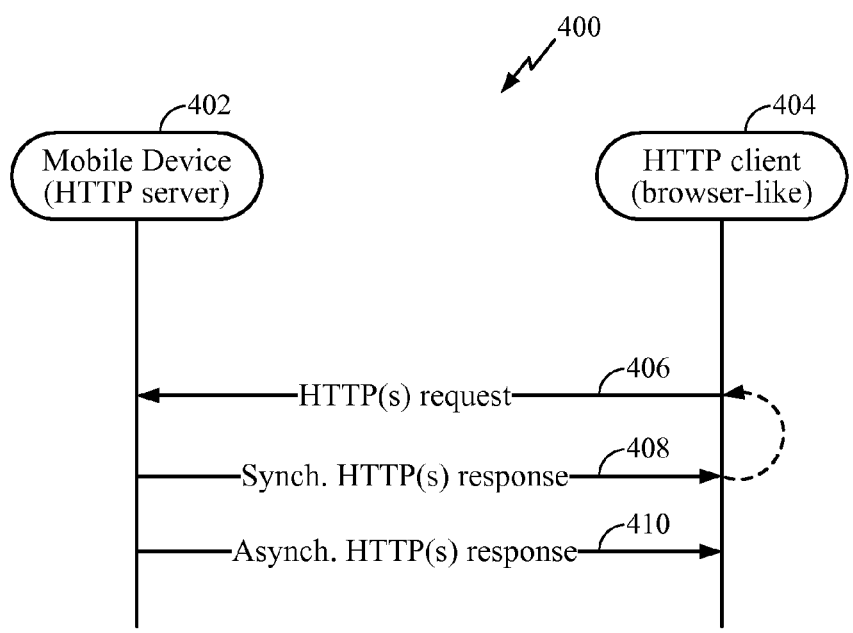
FIG. 4 shows example process flows in aspects of synchronous access and asynchronous access in one multi-network, browser accessible mobile server system and method according to various exemplary embodiments.

FIG. 4 shows process flows 400 in aspects according to one or more exemplary embodiments providing receipt by a mobile web server 402 of an HTTP (or HTTPS) request 404 from an HTTP client/browser 406 and providing synchronous HTTP (or HTTPS) responses 408 and/or asynchronous HTTP (or HTTPS) responses 410.

Figure 5:
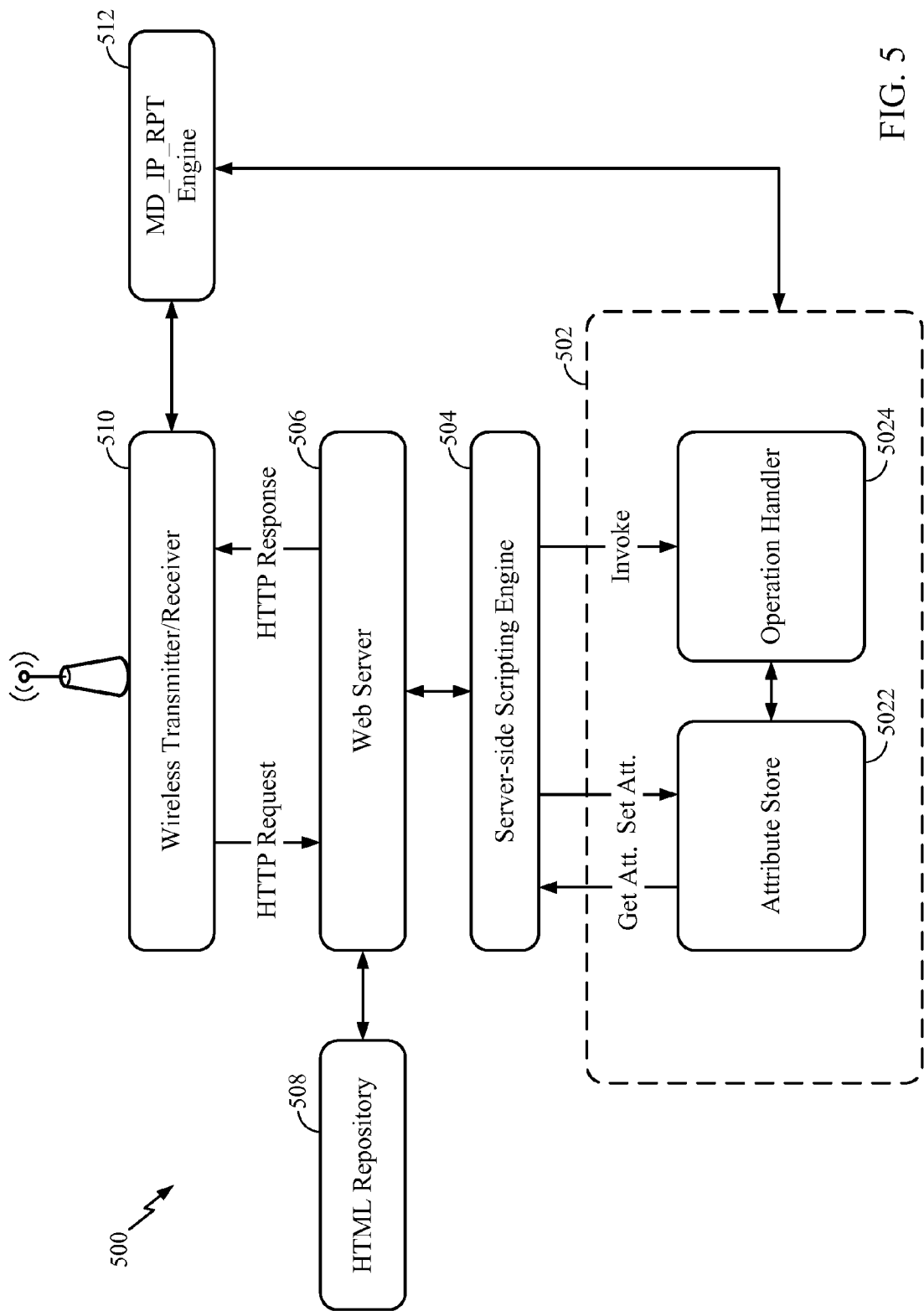
FIG. 5 is a high level functional block diagram of one dynamically addressed, multi-network, browser-accessible, mobile server device according to one exemplary embodiment.

FIG. 5 is a high level functional block diagram of one mobile device/server 500 that can implement a FIG. 1 mobile device 102 hosting the mobile web server 150 and, therefore, any one or more of the FIG. 3 Mobile Device 302 or the FIG. 4 Mobile Device/HTTP Server 402, for practices in accordance with various exemplary embodiments. It will be understood that the FIG. 5 high level functional block diagram is a graphical representation of logical functions that can be included in the mobile device/server 500, and is not intended to be any limit on the scope of the hardware architectures or arrangements that may be used in practices according to the various exemplary embodiments.

Referring to FIG. 5 the mobile device/server 500 can include a processing core 502 having an attribute store 5022 and an operation handler 5024. In an aspect mobile device/server 500 includes Web Server 506 which includes a server-side scripting engine 504 which can invoke the operation handler 5024. As shown, the server-side scripting engine 504 can set, as well as retrieving or extracting attributes from the attribute storage device 5022. In a further aspect the mobile device/server 500 can include an HTML repository 508. In an aspect, the mobile device/server 500 can include a wireless transmitter/receiver 510 for communicating with the FIG. 3 HTTP Redirect Web Server 304 and, in an aspect, the firewall 112. The wireless transmitter/receiver 510 can support, for example, IEEE 802.11 protocol communications. In a further aspect, the mobile device/server 500 can include a cellular wireless network interface (not shown in FIG. 5). In an aspect, the mobile device/server 500 can include an MD_IP_RPT engine 512, for example an application provided in the processing core, for performing dynamic address update reporting such as described in reference to FIG. 2

With respect to the hardware implementation of the processing core 502, those skilled in the art will appreciate that the processing tasks can be assigned to any processor or computational engine capable of executing instructions. The processing function can be centralized in one location or decentralized and distributed to a plurality of processors or processing locations, without departing from the spirit and scope of the disclosed aspects.

Persons of ordinary skill in the art will appreciate, from reading the present disclosure, that among the various benefits of systems and methods according to one or more exemplary embodiments is the providing to users having no more than a conventional computing device hosting a conventional browser, connected to the Internet by conventional techniques, with a ready access to content of another user's mobile device. In one or more aspects, accessing users can be members of the public and the mobile device can belong to a user that, through configuration of a mobile web site hosted on the user's mobile device, wishes to make selected content readily available to the public. Further among the various benefits that will be appreciated by persons of ordinary skill in the art from the present disclosure is the providing of remote, secure, practical administration of the user's mobile device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method as claimed in the claims. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for accessing a web site on a mobile device, comprising:
    receiving at the mobile device an update of a mobile device IP address dynamically assigned to the mobile device;
    sending from the mobile device to a HyperText Transfer Protocol (HTTP) server an updated dynamically assigned address report, having the updated mobile device IP address and a mobile device identifier;
    sending from an HTTP client to the HTTP server an HTTP request having the mobile device identifier;
    receiving at the HTTP client, in response to the HTTP request, a redirect HTTP response having the updated mobile device IP address; and
    sending an HTTP request from the HTTP client to the mobile device at the updated mobile device IP address in the redirect HTTP response.

2. The method of claim 1, wherein the HTTP request based on the redirect HTTP response includes a request to access a web site hosted on the mobile device.

3. The method of claim 1, further comprising sending from the HTTP client to the mobile device identified by the updated mobile device IP address included in the redirect HTTP response, a request for an administrative action on the mobile device.

4. The method of claim 1, further comprising sending from the HTTP client to the mobile device identified by the updated mobile device IP address included in the redirect HTTP response, a request for activating a service on the mobile device.

5. The method of claim 4, further comprising sending from said mobile device to the HTTP client a dynamic data refresh in corresponding to the request for activating the service.

6. The method of claim 1, wherein sending from the mobile device to the HTTP server the updated dynamically assigned address report, comprises:
    activating an HTTP client on the mobile device;
    sending from the HTTP client on the mobile device an HTTP client request to the HTTP server, the HTTP client request having the updated dynamically assigned address report;
    receiving at the mobile device an HTTP server response to the HTTP client request; and
    de-activating the HTTP client on the mobile device in response to receiving the HTTP server response.

7. A mobile device comprising:
    a storage for storing a mobile device identifier (MDID);
    a communication interface for receiving from a network an update of a dynamically assigned network address (MD_IP); and
    a processor coupled to the communication interface, configured to control the communication interface to transmit, in response to receiving the updated MD_IP, a mobile device updated address report to a HyperText Transfer Protocol (HTTP) server, the mobile device updated address report having the updated MD_IP and the MDID;
    wherein the processor includes an HTTP web server configured to host a HyperText Markup Language (HTML) web site, which is configured to provide, in response to given HTTP requests, access to a content stored on the mobile device.

8. The mobile device of claim 7, wherein the processor includes an HTTP web server configured to support a server-side scripting engine.

9. The mobile device of claim 7, wherein the mobile device further comprises an HTML repository storage coupled to the processor, the HTML repository storage configured to retrievably store an HTML repository.

10. The mobile device of claim 7, further comprising:
    an attribute storage device coupled to the processor; and
    an operation handle coupled to the processor.

11. The mobile device of claim 7, wherein the processor is a processor core.

12. A method for accessing a web site on a mobile device on a network comprising:
   sending from a client, through the Internet, to a HyperText Transfer Protocol (HTTP) redirect server connected to the network, a request to access the web site, the request being without an address of the mobile device within the network;
   receiving at the client a response from the HTTP redirect server, the response having the address of the mobile device; and
   sending from the client an additional request to access the web site, the additional request having the address of the mobile device from the received response of the mobile device.

13. A method for accessing a mobile device, comprising:
   receiving from the mobile device a report, the report having an updated dynamically assigned address and an identifier for the mobile device;
   storing in a redirect address database, in a manner retrievable based on the identifier for the mobile device, a redirect address record associating the identifier for the mobile device with the updated dynamically assigned address;
   receiving a request to access the mobile device, the request having the identifier for the mobile device;
   retrieving the redirect address record associated with the received identifier for the mobile device; and
   sending to a HyperText Transfer Protocol (HTTP) client a redirect response to access the mobile device, based at least in part on the updated dynamically assigned address in the retrieved redirect address record.

14. An apparatus for accessing a mobile device, comprising:
   means for receiving at the mobile device an update of a dynamically assigned address;
   means for sending from the mobile device to a HyperText Transfer Protocol (HTTP) server an updated dynamically assigned address report, having the updated dynamically assigned address and a mobile device identifier;
   means for sending from an HTTP client to the HTTP server an HTTP request having the mobile device identifier;
   means for receiving at the HTTP client, from the HTTP server, a redirect HTTP response having the updated dynamically assigned address of the mobile device; and
   means for receiving at the mobile device an HTTP request, associated with the redirect HTTP response, to access a web site on the mobile device.

15. The apparatus of claim 14, wherein sending from the mobile device to the HTTP server the updated dynamically assigned address report comprises:
   activating an HTTP client on the mobile device;
   sending from the HTTP client on the mobile device an HTTP client request to the HTTP server, the HTTP client request having the updated dynamically assigned address report;
   receiving at the mobile device an HTTP server response to the HTTP client request; and
   de-activating the HTTP client on the mobile device in response to receiving the HTTP server response.

16. An apparatus for accessing a web site on a mobile device on a network comprising:
   means for sending from a client, through the Internet, to a HyperText Transfer Protocol (HTTP) redirect server connected to the network, a request to access the web site, the request being without an address of the mobile device within the network;
   means for receiving at the client a response from the HTTP redirect server, the response having the address of the mobile device; and
   means for sending from the client an additional request to access the web site, the additional request having the address of the mobile device from the received response of the mobile device.

17. An apparatus for accessing mobile device, comprising:
   means for receiving from the mobile device a report, the report having an updated dynamically assigned address and an identifier for the mobile device;
   means for storing in a redirect address database, in a manner retrievable based on the identifier for the mobile device, a redirect address record associating the identifier for the mobile device with the updated dynamically assigned address;
   means for receiving from a HyperText Transfer Protocol (HTTP) client a request to access the mobile device, the request having the identifier for the mobile device;
   means for retrieving the redirect address record associated with the received identifier for the mobile device; and
   means for sending to the HTTP client a redirect HTTP response to access the mobile device, based at least in part on the updated dynamically assigned address in the retrieved redirect address record.

18. A computer-readable medium comprising instructions, which, when executed by a processor apparatus in a wireless communications system, cause the processor apparatus to perform operations carrying out a method for accessing a mobile device, comprising instructions that cause the processor apparatus to:
   receive at the mobile device an update of a mobile device IP address dynamically assigned to the mobile device;
   send from the mobile device to a HyperText Transfer Protocol (HTTP) server an updated dynamically assigned address report, having the updated mobile device IP address and a mobile device identifier;
   send from an HTTP client to the HTTP server a request to access the mobile device, the request having the mobile device identifier;
   receive at the HTTP client, from the HTTP server, a redirect HTTP response having the updated mobile device IP address; and
   send an HTTP request from the HTTP client to the mobile device at the updated mobile device IP address in the redirect HTTP response identified by the updated mobile device IP address in the redirect HTTP response.

19. The computer-readable medium of claim 18, wherein the HTTP request from the HTTP client to the mobile device identified by the updated mobile device IP address in the redirect HTTP response includes a request to access a web site hosted on the mobile device, and wherein the redirect HTTP response includes information associated with the web site.

20. The computer-readable medium of claim 18, wherein the instructions that cause the processor apparatus to send from the mobile device to the HTTP server the updated dynamically assigned address report comprise instructions that cause the processor apparatus to:
   activate an HTTP client on the mobile device;
   send from the HTTP client on the mobile device an HTTP client request to the HTTP server, the HTTP client request having the updated dynamically assigned address report;

receive at the mobile device an HTTP server response to the HTTP client request; and de-activate the HTTP client on the mobile device in response to receiving the HTTP server response.

21. A computer-readable medium comprising instructions, which, when executed by a processor apparatus in a wireless communications system, cause the processor apparatus to perform operations carrying out a method for accessing a web site on a mobile device on a network, comprising instructions that cause the processor apparatus to:

send from a client, through the Internet, to a HyperText Transfer Protocol (HTTP) redirect server connected to the network, a request to access the web site, the request being without an address of the mobile device within the network; and receive at the client a response from the HTTP redirect server, the response having the address of the mobile device; and send from the client an additional request to access the web site, the additional request having the address of the mobile device from the received response of the HTTP redirect server.

22. A computer-readable medium comprising instructions, which, when executed by a processor apparatus in a wireless communications system, cause the processor apparatus to perform operations carrying out a method for accessing a mobile device, comprising instructions that cause the processor apparatus to:

receive from the mobile device a report, the report having an updated dynamically assigned address and an identifier for the mobile device;

store in a redirect address database, in a manner retrievable based on the identifier for the mobile device, a redirect address record associating the identifier for the mobile device with the updated dynamically assigned address;

receive from a HyperText Transfer Protocol (HTTP) client a request to access the mobile device, the request having the identifier for the mobile device;

retrieve the redirect address record associated with the received identifier for the mobile device; and send to the HTTP client a redirect response to access the mobile device, based at least in part on the updated dynamically assigned address in the retrieved redirect address record.

* * * * *